Figure 1:
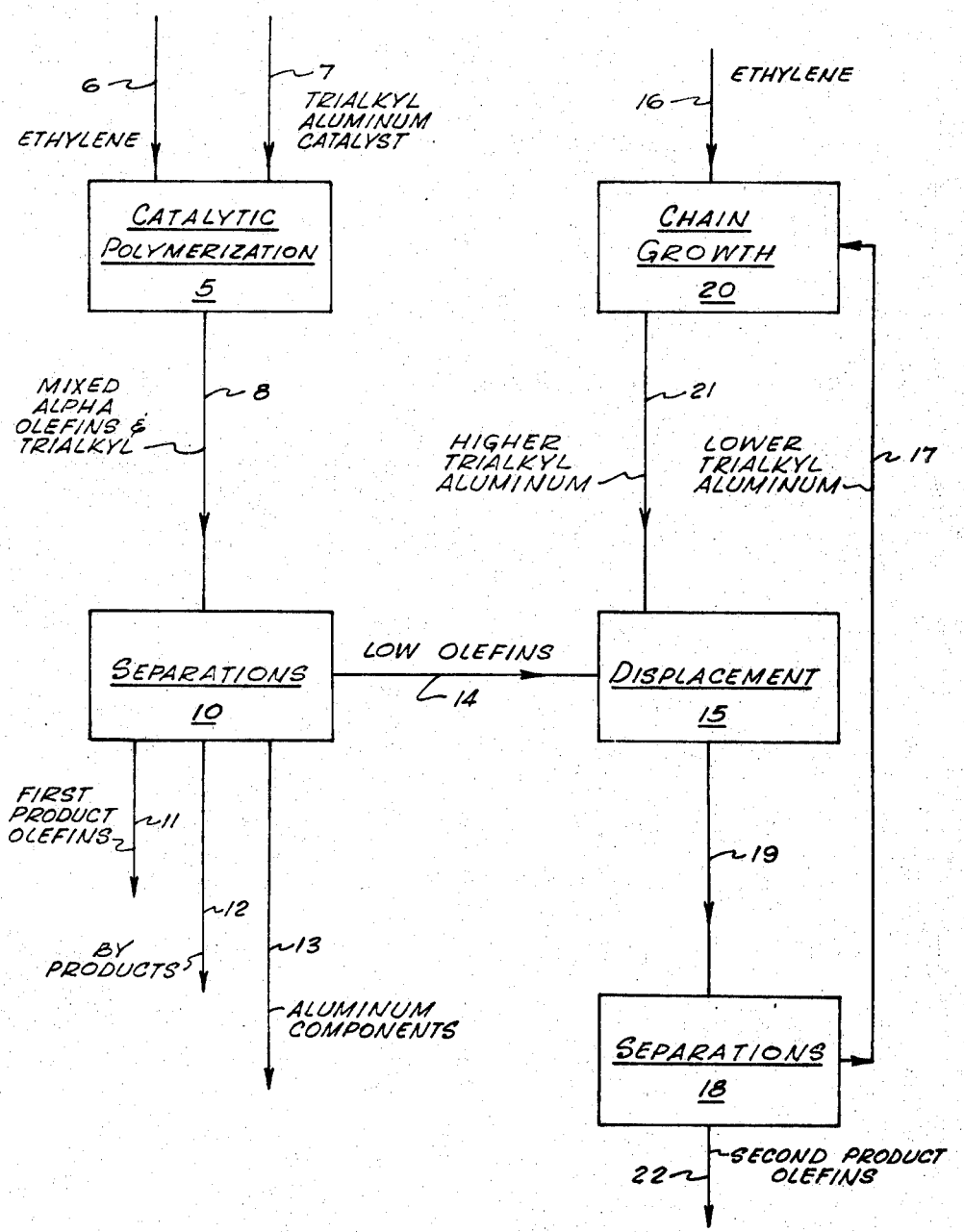

United States Patent Office 3,391,219
Patented July 2, 1968

3,391,219
PRODUCTION OF OLEFINS
Wayne T. Davis and Marcelian F. Gautreaux, Baton Rouge, La., assignors to Ethyl Corporation, New York, N.Y., a corporation of Virginia
Filed Apr. 25, 1962, Ser. No. 190,030
3 Claims. (Cl. 260—683.15)

INTRODUCTION

This invention relates to the manufacture of hydrocarbons from ethylene. More particularly, the invention relates to a new and highly flexible technique and process whereby straight chain, normal alpha olefins, of desired chain length ranges or molecular weights, can be highly efficiently synthesized from ethylene as the basic raw material.

BACKGROUND AND PROBLEM

It is known that ethylene can be converted to higher molecular weight olefin hydrocarbons by polymerization or controlled polymerization in the presence of a catalyst of which an aluminum trialkyl is a particular species, other suitable catalysts being the corresponding alkyls of beryllium, gallium, or indium, as is taught in Ziegler and Gellert patent, U.S. 2,699,457. It is also known that ethylene can be added, in molecular multiples, to such organometallics, i.e. aluminum trialkyls, or similar compounds of beryllium, to form, for example, aluminum trialkyls wherein the alkyl groups are of appreciably longer chain length. Such an operation is shown in Ziegler and Gellert Patent 2,826,598 and in Republic of South Africa Patent 60/4,695. Aluminum trialkyls which can be generated in this fashion are susceptible to treatment with normally gaseous olefins, of which ethylene is the preferred example, whereby a longer molecular weight olefin is released and an aluminum ethyl moiety is reestablished. One method of conducting such a displacement process is that described in Belgian Patent 594,803.

Despite the above described knowledge already in the art, these operations to produce olefinic hydrocarbons have found very little commercial usage up to the present time. Particular difficulties are encountered in both types of syntheses, viz., the catalytic polymerization of ethylene to provide the relatively low molecular weight alpha olefins, and the stoichiometric sequence, whereby ethylene is chain grown to form relatively long alkyl groups of trialkyl aluminum compounds followed by a displacement or a pyrolysis of the trialkyl aluminum to yield the corresponding olefin from the alkyl groups. The difficulty encountered with the polymerization by catalytic means is that, when following the prior art technique, the olefins generated follow a wide distribution of molecular weight ranges, even if the process is controlled so that the products "peak" at a desired molecular weight component or range of components. In addition, the catalytic polymerization technique frequently results in an undesirably high amount of vinylidene type alpha olefins, which are usually not desired for end uses and are considered impurities. The normal alpha olefins, hereinafter termed vinyl olefins, are the olefinic products most desired. The present opinion in the art is that a catalytic polymerization process is really not feasible for commercial manufacturing operations (see, for example, Ziegler et al., Ann. der Chemie 629, pp. 172–198 (March 1960)). A somewhat similar difficulty exists when attempts are made to generate olefins in a desired molecular weight range, starting from ethylene and chain growing the ethylene on trialkyl aluminum, followed by a displacement operation. In the chain growth type of process the trialkyl aluminum generated in the first or chain growth step contains alkyl groups having a statistical or Poisson type of distribution. Thus, for example, if a tetradecene olefin or fourteen carbon alpha olefin products were desired, it is impossible to generate this particular component exclusively. Instead, the trialkyl aluminum intermediate contains alkyl groups ranging from two to thirty carbon atoms, so that the olefins which can be engendered from this trialkyl aluminum also have the undesired molecular weight distribution. It is impractical to separate trialkyl aluminum compounds from a broad spectrum mixture by a distillation because of the large number of molecular species which are available owing to the tervalence of the aluminum, and the possible existence of an enormous number of specific compounds, differentiating one from the other very little in boiling points. An even more serious problem in connection with the distillation is the need for operating at very low pressures to prevent thermal decomposition of the trialkyl aluminum compounds.

From the foregoing, it is seen that although trialkyl aluminum chemistry as developed within the last several years has provided significantly new and novel chemical reactions, these have not been susceptible to practical usage for the above and other reasons.

OBJECTS

The principal object of the present invention is, then, to provide a highly efficient process whereby ethylene is converted to alpha olefin products of the liquid to low melting solid range, the molecular weight being controllable to a much greater degree than heretofore, and the chemical character of the products being directable to a high proportion of vinyl type alpha olefins. A more particular advantage is to circumvent to a large degree the specific weaknesses or disadvantages associated with catalytic ethylene polymerization, and ethylene chain growth on trialkyl aluminum, which have been heretofore encountered. A further particular object is to provide in combination process or chemical reaction operations which take advantage of the potential advantages of each of the foregoing chemical possibilities. Another particular object is to provide a new and novel integrated process for the generation of vinyl olefins, in high and acceptable purity, readily and efficiently from ethylene. Another specific object, when desired, is to provide a process capable of generating a narrow "cut" of vinyl olefin product compounds, wherein the weight distribution of the individual components in said cut are adjustable to more favorable proportions. A further object is to provide, in the preferred embodiments of the invention, an integrated process for the generation of a desired vinyl olefin fraction while substantially curtailing concurrent production of olefins higher than the desired ranges.

UTILITY OF PRODUCTS

The vinyl olefins which are made by the present integrated and combined process have a high degree of known utility in the art. Relatively narrow cut vinyl olefins are particularly suitable as starting materials for use in subsequent alkylation of aromatic hydrocarbons, which find ready use for sulfonation in preparation of detergent components. The olefin compounds themselves are also convertible by sulfonation to surface active materials. In addition, vinyl olefins can be converted to corresponding primary alcohol compounds or narrow cut mixtures of compounds by anti-Markownikoff addition of hydrogen bromide and hydrolysis of the said intermediate alkyl bromide, to release a corresponding alcohol. Other uses contemplated include the conversion of olefins by polymerization to particular types of polymers, or the dehydrogenation thereof to produce desired diolefins also susceptible to polymerization.

GENERAL STATEMENT OF INVENTION

The invention in all forms consists of a particular combination of a catalytic ethylene polymerization with a "stoichiometric" olefin generation section, which latter includes a displacement step and a chain growth step. For reference herein, this latter segment or section of the combined process is identified as the chain growth process section. In all cases, then, the invention includes the combination, to make olefins, of a catalytic operation and a chain growth process operation (chain growth being as above defined, viz, including chain growth and displacement steps). As detailed more fully hereinafter, a vital feature of the invention is the withdrawal of a lower-than-desired olefin fraction from the catalytic section and its transfer as a reactant to the chain growth operations, more specifically, to the displacement step thereof. This step is found to provide extremely significant benefits in the combined process as will be apparent hereinafter.

In the catalytic polymerization section fresh ethylene is converted to a mixture of alpha olefins, predominating in vinyl olefins, and having a substantial number of components therein ranging from butene up to the fraction desired, plus concurrent production of olefins with appreciably greater molecular weight, or chain length, than the desired product or fraction of product. This polymerization is carried out at elevated temperature and pressure, and in true catalytic manner, viz, wherein a trialkyl aluminum constituent is provided and utilized in true catalytic manner. In other words, a substantial number of moles of ethylene are reacted for every aluminum-carbon bond existing in the reactor section.

The effluent from this first or catalytic polymerization section is divided into several segments, including the desired olefin product cut or fraction, and at least one or more olefin products of lower molecular weight than the desired olefin product cut. At least a portion of the last mentioned olefins is removed from the catalytic section and transferred as a feed component to the chain growth section.

The chain growth section includes a first segment wherein a displacement reaction is carried out and a further segment in which a chain growth reaction is performed. In the first segment, the olefin stream transferred from the catalytic polymerization section is reacted with a trialkyl aluminum mixture. Said trialkyl aluminum feed includes a substantial proportion of alkyl groups having longer chain length than any of the olefins reacted therewith. The reaction is carried out at elevated temperature and under conditions appropriate to result in the release of olefins corresponding to the original aluminum alkyl groups, and in the synthesis of trialkyl aluminum components, the alkyl groups corresponding to the lower olefins from the polymerization section. This product mixture is then separated, into a stream of olefins of the desired molecular weight, termed the second product olefins, and the lower trialkyl aluminum resulting from the displacement reaction. The latter is then circulated to a chain growth reaction zone, wherein a stoichiometric reaction with ethylene is carried out to increase the average alkyl group length of the aluminum trialkyl fed.

FIGURES

Figure 2:
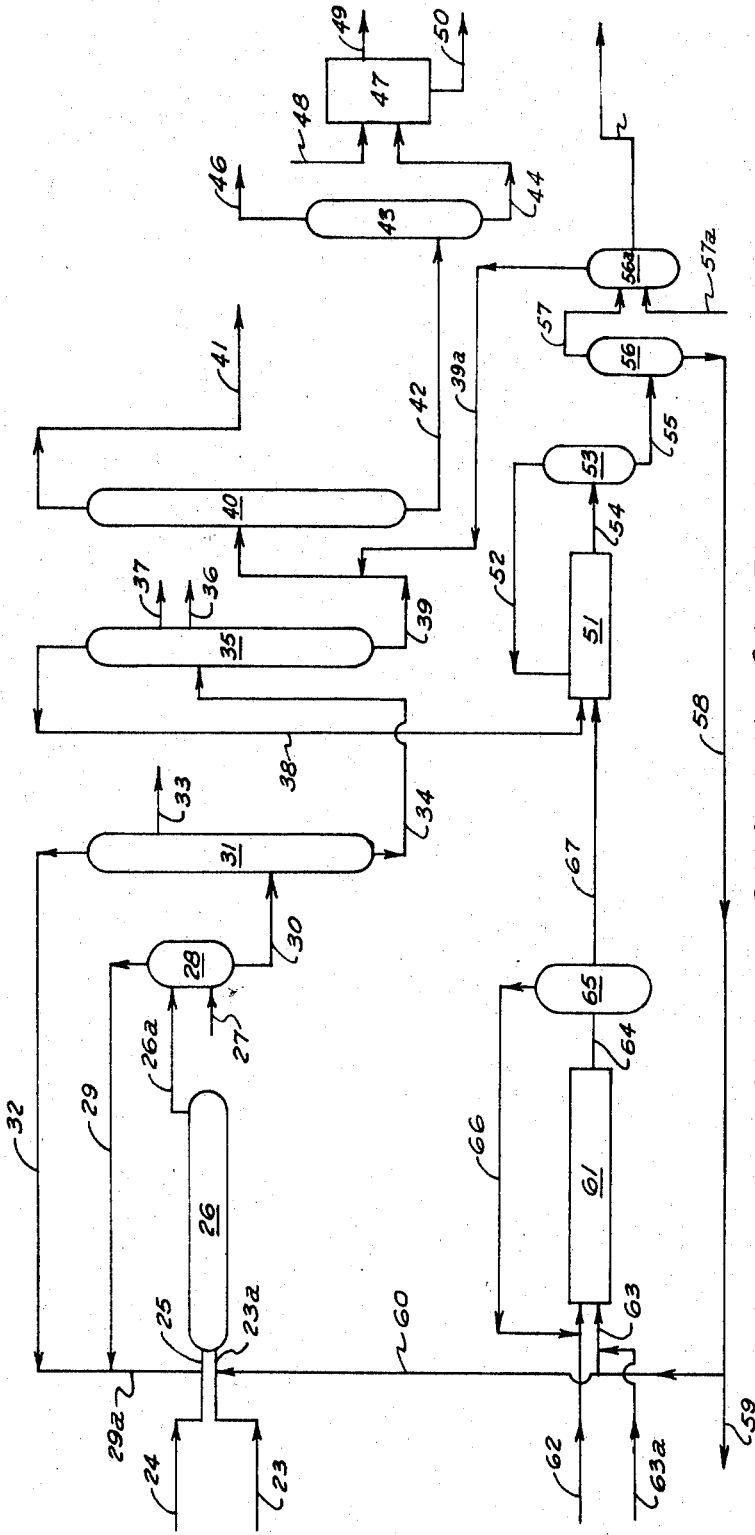

The principles of all forms of the invention, and the details of particular embodiments thereof, will be more readily understood from the example and detailed description given below, and from the accompanying figures, wherein:

FIG. 1 is a generalized schematic flow sheet showing the interrelation of the several operations of the process, and FIG. 2 is a more detailed schematic flow diagram provided for more specific illustration of the class of embodiments of the invention.

GENERALIZED REPRESENTATION

Referring to FIG. 1, the principal operations of all forms of the process of the invention are illustrated. It will be seen that a catalytic polymerization section is one major part of the installation. Ethylene and alkyl aluminum catalysts are fed through feed lines 6, 7 to a polymerization zone 5, generating a polymerization effluent stream which is transferred through line 8 to a separation zone 10. The separation operations produce a low olefins stream transferred through line 14 to the chain growth section. Also discharged by the separation operations are various by-products 12 and aluminum components 13.

The chain growth section includes two reaction sections, a chain growth section 20 and a displacement reaction section 15. The low olefin stream from the separation zone of the catalytic polymerization section, is received through line 14 and is one of the feed streams fed to the displacement reaction section, the other being a higher trialkyl aluminum stream received through line 21, the alkyl groups thereof having a substantial proportion of a chain length corresponding to that desired for the olefins to be derived from the chain growth section of the installation. The effluent from the displacement reaction zone 15 is discharged through a line 19 to a separation zone, this stream including lower trialkyl aluminum components and olefins of higher chain length. The separation zone 18 of the chain growth section separates a lower trialkyl aluminum cut, and discharges this through line 17, and also separates an olefin stream, discharged through line 22, the components including the desired second olefin product fraction, as well as other materials obtained as by-products to be mentioned in more detail hereinafter. The lower trialkyl aluminum fraction isolated by the separation section 18 is returned or fed to a chain growth reaction section, and is therein reacted with ethylene provided through an ethylene feed line 16. The chain growth operation is conducted on a substantially stoichiometric basis, although some ethylene may be passed through unreacted, and a minor amount of by-product olefins are engendered, the product from the chain growth reaction zone 20 thus predominating in higher trialkyl aluminum components, including alkyl groups corresponding to the desired second product olefin stream. This mixture is transferred through line 21 to the displacement reaction zone as heretofore mentioned.

The precise details of the several reaction zones involved in all forms of the process of the invention, and of the recovery operations, and of the identity and composition of the various process streams, can vary greatly without departing from the spirit of the invention. In the following description, the desired product fraction is identified as a mixture of dodecene, tetradecene, and hexadecene vinyl olefins, having a purity of at least about 90 weight percent. It will be understood that the principles of operation are fully applicable in the production of other product fractions.

DESCRIPTION OF PROCESS FLOWSHEET (FIG. 2)

To illustrate in more detail the apparatus layout suitable for a specific and preferred embodiment of the invention, FIG. 2 shows a schematic representation of such a plant installation. In FIG. 2, for simplicity, there is no representation of auxiliary equipment such as valves, compressors or control devices.

In the polymerization section of the installation, the principal apparatus units include a catalytic reaction vessel 26 having a series of separate towers or fractionators 28, 31, 35, 40 and 43. In the chain growth section, the principal apparatus units include a chain growth reaction apparatus 61 and a displacement reactor 51 plus a plurality of vaporizer separation vessels 65, 53, 56.

A fresh ethylene feed line 24 joins a line $29_a$ for recycled olefins, the combined streams being fed through a line 25 to a reactor 26. The recycled olefins line $29_a$ is supplied by an ethylene recycle line 29 and a second olefin recycle line 32. Also supplied to the reactor is a catalytic amount of a trialkyl aluminum through catalyst feed line $23_a$. An effluent line $26_a$ from the catalytic polymerization reactor connects to a flash chamber 28, wherein highly volatile olefins, particularly ethylene, can be vaporized and recycled to the reaction zone. Also, the flash chamber 28 provides for concurrently carrying out an oxidation of the aluminum alkyl component in the catalytic reactor effluent by introducing oxygen or an oxygen containing compound through line 27. A bottoms line 30 from the flash chamber 28 connects to the first fractionator 31.

The first fractionator column 31 provides for separation of an overhead volatile olefin stream, predominating usually in butene-1, and provision is made by an overhead line 32 for return of these olefins to the catalytic polymerization reactor. A side draw off line 33 is provided for discharge of low volatility olefins when desired. A second fractionating column 35 is fed by line 34 and provides, usually, a separation of olefins of greater than four carbon atoms, but less than a desired product fraction. Thus, in the case of the desired product fraction being the dodecene through hexadecene mixture, the overhead to be separated by the fractionator 35 includes alpha hexenes, octenes, and decenes. Provision is made, by side take-off lines 36, 37 for concurrent withdrawal from the fractionating column 35 of other side streams, when desired or necessary, for by-product streams. A final column 40 in this section is provided to take off an overhead first product stream, which is discharged through line 41. The bottoms in line 42 from this column include olefins of higher molecular weight than the desired product stream, as well as aluminum alkoxide components. A final flash separation column 43 provides for the flash separation of some of the higher olefin constituents from the aluminum alkoxide constituents, discharge lines 46 and 44 respectively being provided. A hydrolyzer 47, fed by line 44, is provided whereby the aluminum alkoxide constituents are hydrolyzed with an aqueous phase, fed by line 38, to generate alcohols corresponding to the alkoxide groups. The bottoms line 50 discharges an aqueous and inorganic salt mixture, a hydrocarbon line 49 being also provided.

In the chain growth section, as already mentioned, a displacement reactor 51, and a chain growth reactor 61 are provided.

The displacement reactor 51 receives olefins, via line 38, from the polymerization section separation zone, these olefins being of lower molecular weight than the olefins produced as the first product olefin stream from the polymerization section. Also fed to the displacement reactor 51 is a trialkyl aluminum mixture provided through line 67. In the displacement reactor the transferred olefins received through line 38 and the higher aluminum alkyls received through line 67 are caused to interreact, the effluent being discharged through line 54. A separatory column 53 is provided to the displacement reactor effluent received from line 54. An overhead line 52 returns to the displacement reactor 51, and a bottoms line 55 passes to a final flash separation column 56. This is provided to fractionate out an overhead to line 57 which includes vinyl olefins of the desired product range and very minor proportions of alkyl aluminum constituents. The overhead line 57 feeds an oxidizing unit $56_a$, which is also fed by an oxidizing agent feed line $57_a$. Discharge lines from the oxidation unit $56_a$ include the normal discharge line $56_b$, which connects to a recovery column not shown, for separation of the desired product olefins from any aluminum alkoxides formed in the oxidation unit $56_a$. An alternative line $39_a$ is provided whereby the discharge from the oxidation unit $56_a$ can be transferred to the feed line 39 to the final column 40 of the catalytic polymerization section. This is particularly convenient when the two olefin products from the two sections of the process are to be blended as a single product. A bottoms line from the final flash separation column 56 is provided, the bottom being a trialkyl aluminum mixture resulting from the reaction in the displacement reactor 51. A return line 58 provides for transfer of this bottoms stream and branch lines 59 and 60 allows for use of a portion thereof as a catalyst component fed to the catalytical polymerization reactor 26 through line 60 or its withdrawal from the process through line 59. The bulk of this stream, however, is fed to the stoichiometric chain growth reactor 61 through line 63. A supplemental trialkyl aluminum feed line $63_a$ is provided whereby fresh trialkyl aluminum can be introduced to the chain growth reactor 61 when needed. The chain growth reactor 61 also receives ethylene provided through line 62 and recycled excess ethylene through line 66. An effluent line 64 provides for discharge of the reactor effluent from the chain growth reactor to a flashing operation 65, wherein volatile olefins are vaporized from the effluent and recycled through line 66. The liquid phase residuum after flashing is transferred through line 67 to comprise a feed to the displacement reactor 51.

To describe more fully an operation of the process as a working example, the following illustrates the operation of the apparatus installation shown by FIG. 2 wherein the first product olefin stream and the second product olefin stream are both the same desired composition and this composition consists of dodecene through hexadecene vinyl olefins, the purity of the product streams being at least about 90 mole percent vinyl constituents.

Example 1

In this example, ethylene is fed through line 24 to the catalytic reaction zone 26, along with trialkyl aluminum catalyst provided through line 23. The catalytic polymerization reactor is operated at a temperature of about 175 to slightly over 200° C., and at a pressure of about 2000–3500 pounds per square inch. In addition to the net ethylene feed, the return line $29_a$ provides a mixture of low molecular weight olefins, derived from the flash chamber 28 and the first fractionator 31, and consisting predominantly of ethylene and normal-butene. The amount of ethylene recycled is substantial, amounting to about 50 to 150 percent of the net ethylene feed provided through line 24.

The effluent from the catalytic reaction zone is discharged through outlet line $26_a$ to the first flash fractionator to which also is provided, through line 27, oxygen, air, or other oxidizing agent in sufficient quantity to react with the trialkyl aluminum components and convert these to aluminum alkoxides. The reason for this treatment is the necessity of eliminating catalytic activity of the trialkyl aluminum constituents prior to the time when olefins and aluminum constituents are fed to the first fractionating column 31, through the feed line 30.

The first fractionator 31 operates usually at a substantially lower pressure than the catalytic reaction zone, a typical pressure being about 180 to 220 pounds per square inch, the bottoms temperature of the column being about 230° C. This column fractionates out an overhead stream predominating in normal butene, and provision is made by line 33 for withdrawal, if desired, of a fairly volatile olefin fraction as a by-product cut. The bottoms from the first fractionator, then, include the olefins of six or more carbon atom content, plus the aluminum compounds resulting from the initial catalyst feed. This mixed feed is then fed to the intermediate fractionator 35, which is provided to separate overhead an alpha olefin cut of volatility lower than the desired product olefins. In this particular instance, the overhead stream discharged through line 38 consists predominantly of hexene, octene, and decene, in the concentration of approximately 42, 33 and 25 weight percent. This intermediate column operates at atmospheric pressure, the bottoms temperature being about 230° C. The bottoms stream includes the olefins of higher chain length than the desired product fraction, the aluminum constituents and the desired product fractions. Product column 40, which operates at a sub-atmospheric pressure of about 0.1 atmosphere, separates the desired product fraction and discharges it through the first product line 41, this fraction consisting of approximately 46 weight percent dodecene, 32 percent tetradecene, and about 22 percent hexadecene.

The bottoms from the product column 40 are transferred through line 42 to a flash column 43, wherein the higher-than-desired olefins are flashed overhead and discharged through line 46 and the bottoms, predominating in aluminum trialkoxide, in the presence of the heaviest molecular weight hydrocarbon olefins, are transferred to a hydrolysis zone 47 wherein a dilute aqueous acid is fed through line 48, resulting in the hydrolysis of the alkoxides, and the formation of an uppermost layer of alcohols, corresponding to the alkoxide radicals and a bottoms layer which is an aqueous phase having the aluminum salts therein. The alcohols are discharged through line 49 as a by-product and the aqueous phase and aluminum salts are discharged through line 50.

Turning to the chain growth section, as already stated, the intermediate olefins separated by the intermediate column 35 and transferred to line 38 consists of a mixture of hexene, octene and decene, and these are fed to the displacement reactor 51, along with trialkyl aluminum received through line 67, which trialkyl aluminum has, typically, a distribution of alkyl groups as given below.

| Alkyl group: | "Mole" percent |
| --- | --- |
| Hexyl | 12 |
| Octyl | 25 |
| Decyl | 34 |
| Dodecyl | 20 |
| Tetradecyl | 7 |
| Hexadecyl | 2 |
| 18 carbons and up | <1 |

The intermediate olefins, and the above described trialkyl aluminum stream are reacted together at a temperature of about 280–320° C., and a pressure of about 150 pounds per square inch, the time of contact at these operating conditions being relatively limited. The intermediate olefin stream actually fed to the reactor 51 includes the supply transferred from the catalytic polymerization section through line 38, as well as a recycle stream provided through line 52, so that the net ratio of olefins to the alkyl groups of the trialkyl aluminum supply stream is about 10–20:1 moles per alkyl group.

As a result of the displacement treatment in the reactor 51, the effluent discharged through line 54 contains aluminum alkyls corresponding generally to the intermediate olefins provided to the reactor, and excess intermediate olefins, and higher molecular weight olefins derived from the trialkyl aluminum feed fed through line 67. A typical average composition of the alkyl portion of the stream is as follows.

| Alkyl group: | Mole percent |
| --- | --- |
| Hexyl | 20 |
| Octyl | 30 |
| Decyl | 45 |
| Dodecyl and higher | <5 |

The mixture of these components is rapidly cooled and flashed in the flash chamber 53, which is operated at a pressure of below one atmosphere, usually about one-sixth to one-seventh atmosphere with a bottoms temperature of about 120° C.

The bottoms stream passes through line 55, to the flash chamber 56, which necessarily operates at a quite low pressure of about 1 to 10 millimeters pressure, with a bottoms temperature of about 120° C. This flash fractionator produces an overhead predominating in the desired product olefin stream, viz., vinyl olefins of from 12 to 16, inclusive, carbon atoms. Occasionally, minor quantities of trialkyl aluminum compounds may appear in this overhead stream, viz., having ethyl and butyl groups. Such components can be the result of side reactions in the chain growth reactor 61, and/or incomplete separation in the flash chamber 65. If the olefins in the feeds to the displacement reactor 51 are freed of olefins of less than six carbon atoms, the overhead from the flash fractionator 56 will be substantially free of trialkyl aluminum compounds.

The overhead then goes to an oxidizer 56$_a$ to which is fed oxygen or an oxidizing stream through line 57$_a$, for conversion of the above-mentioned trialkyl aluminum impurity to the corresponding aluminum trialkoxide. The thus treated stream is, desirably, passed through line 39$_a$ so that it can be processed with the first product column 40. Alternatively, the treated stream from the oxidizer 56$_a$ can be transferred by line 56$_b$ to an independent separatory column, not shown, when it is desired to obtain a separated and second product olefin stream. The bottoms from the product flash chamber 56, discharged through line 58, comprise predominately trialkyl aluminum components corresponding in alkyl group distribution to the intermediate olefins used as a displacing agent in a displacement reactor 51. This trialkyl aluminum mixture is fed through line 63 to the chain growth reactor 61, and make up trialkyl aluminum is also supplied thereto in line 63$_a$. The quantity of make-up trialkyl aluminum is usually quite low. Usually, a portion of the trialkyl aluminum received through line 58 can be discarded through draw-off line 59, and also a portion can be transferred through line 60 to the catalytic reactor of the polymerization section, in which instance the supply of a separate, fresh feed of catalyst through line 23, thereto, can be omitted. The transfer of a portion of trialkyl aluminum through line 60 to the catalytic polymerization zone 26 is particularly beneficial in that this not only supplies catalyst requirements, for catalytic polymerization, but also removes from the chain growth section the minor quantities of olefins, of higher molecular weight than desired. Such olefins are readily removed in the recovery operations associated with the catalytic section.

The stoichiometric or chain growth reactor 61 operates at a temperature of about 100 to 130° C., and at a moderately elevated pressure of about 1450–1550 pounds per square inch or greater. Fresh ethylene and recycled ethylene are supplied thereto by the fresh ethylene line 62 and the recycle line 66. In the reaction in the stoichiometric chain growth reactor, the average length of the alkyl groups of the trialkyl aluminum fed is increased appreciably, but in this particular example the increase in chain length is minimized to largely avoid the formation of any alkyl groups higher than the alkyl groups corresponding to the desired upper chain length limit for the desired product olefin. In other words, as the desired product fraction is a mixture of dodecene, tetradecene, and hexadecene, the chain growth reaction is curtailed and controlled whereby substantially no, or only minor quantities of alkyl groups of 18 or more carbon atoms are formed. This operation is particularly beneficial in that the formation of an undesired, high molecular weight olefin by-product stream from this section of the process is minimized.

In the present example, wherein the desired product fraction is the aforesaid mixture of dodecene, tetradecene, and hexadecene, the composition of the reactor effluent discharged through line 64, on an ethylene free basis, is the same as already given as the feed composition to the displacement reaction step in reactor 51. The reactor effluent, passing to flash chamber 65, cools to about 100° C., and the pressure is lowered to one atmosphere. As a result, virtually all of the excess ethylene is stripped off. The amount of ethylene stripped and discharged through line 66 is about one mole per mole of fresh ethylene supplied to line 62. In other words, the net feed to the chain growth reactor 61 includes about 100 percent excess ethylene.

The trialkyl formed and separated by the flash chamber 65, then passes through the transfer line 67 to the displacement reactor 51 as previously described.

The second product olefins comprising the overhead from the flash fractionator 56 include olefins having the following weight percent distribution:

Dodecene _____ 65
Tetradecene _____ 26
Hexadecane _____ 9

These may be transferred to the recovery section of the catalytic section through line 39$_a$, if a blended product is desired. Alternatively, the olefins generated by the displacement operation can be withdrawn as a second, and separate product stream through line 56$_b$, any trialkyl aluminum components therein being oxidized in oxidizer 56$_a$. In this latter case, about 4 to 4.5 parts by weight of second product olefins are generated per part of first product olefins.

In the above example, the olefins of the second product fraction contain well over 90 weight percent vinyl purity, usually, above about 95 weight percent. The olefins of the first product fraction are about 90 weight percent vinyl purity. When these two streams are blended, the proportions of the individual olefins, and the vinyl purity of the blended stream, is of course, intermediate between the above values.

It will be seen from the concentration of the several components of the two product streams of the foregoing example, that the process provides excellent flexibility for concurrently making two product streams of differing characteristics, with respect to the distribution of the same components within said streams, and with respect to the concentration of the desired vinyl content.

The process of the invention is capable of numerous variations to accomplish particular results, and yet retain the general characteristics. Some of these are illustrated in the following example.

Example 2

In Example 1, the catalytic polymerization operation was marked by the return to the catalytic reactor 26 of n-butene separated from the product streams in the fractionator 31.

When the operation of Example 1 is repeated, but instead of return of the butenes to the catalytic reactor, that particular fraction is withdrawn through line 33 as a side stream for other purposes, the vinyl purity content of the olefin stream in the $C_{12-16}$ desired range, generated in the polymerization section, is increased to well over 90 percent, and usually about 95 weight percent vinyl purity.

As previously implied, the indentity of the lower-than-desired olefin stream, withdrawn from the polymerization section as a reactant for the stoichiometric or chain growth section, is a factor in the proportions of individual components in, and relative amounts of the two product olefin streams. A partial illustration of the effect of this factor is shown in the following examples, wherein the composition of the first product stream, derived from the polymerization reaction, is the same as in Example 1.

Composition of first olefin product from catalytic polymerization zone:

|  | Wt. percent |
|---|---|
| $C_{12}^=$ | 46 |
| $C_{14}^=$ | 32 |
| $C_{16}^=$ | 22 |

Olefins transferred from the catalytic section through transfer line 38 are essentially only octenes and decenes.

| Example | Moles of ethylene reacted per mole alkyl aluminum bond per pass in chain growth reactor 61 | Olefins of product two, from displacement reactor 51 | | Ratios, weights of second product per weight first product | Blended composition, both olefin products |  |
|---|---|---|---|---|---|---|
| 3 | 1.0 | $C_{12}^=$ | 58 | 2.2–2.3 | $C_{12}^=$ | 54 |
|  |  | $C_{14}^=$ | 31 |  | $C_{14}^=$ | 31 |
|  |  | $C_{16}^=$ | 11 |  | $C_{16}^=$ | 15 |
| 4 | 0.5 | $C_{12}^=$ | 75 | 2.0–2.1 | $C_{12}^=$ | 66 |
|  |  | $C_{14}^=$ | 21 |  | $C_{14}^=$ | 25 |
|  |  | $C_{16}^=$ | 4 |  | $C_{16}^=$ | 9 |

From the foregoing, it is seen how the process of the present invention can be varied to provide different results as desired. Thus, from Examples 1 and 2, it is seen that by eliminating a recycle of low olefins to the catalytic polymerization section reactor, that the vinyl purity of the first product olefin stream is increased. Also, by variation of the identity of the lower-than-desired olefin stream transferred from the catalytic polymerization section to the chain growth section, the distribution of components in the second product stream can be appreciably and conveniently altered. Further variation in the composition of the second product stream (from the chain growth section) is permitted by variation of the number of moles of ethylene reacted per pass of the trialkyl aluminum fed through the chain growth reactor 61 of FIGURE 2. Thus, comparison with Examples 3 and 4 shows that a lower degree of growth per pass results in a product having appreciably higher dodecene, and much lower hexadecene, than when the ethylene addition per pass is higher. Thus the concentration of the components in the several product streams can be rapidly and efficiently adjusted according to the particular needs of the moment.

The foregoing examples are all illustrative wherein the two product streams are to have the same chain length range of component, viz., from dodecene to hexadecene. As already indicated, from each operation, two separate streams of different analyses can be readily derived, or when needed, the two streams can be blended by transfer of the second product stream to the first product stream recovery section (through line 39$_a$ of FIG. 2) or can be separately withdrawn.

In some situations it is highly desirable to produce product streams which differ in having different ranges of chain lengths of the components, as in Example 5 below.

Example 5

In this operation, Example 1 is repeated except that the product stream delivered from the catalytic polymerization section, through line 41, is a $C_{14-20}$ cut, and the product stream derived from the chain growth section is, as before, a cut including $C_{12-16}$ olefins.

Similar variation is readily achieved for many other specific product stream chain length ranges. Thus, when desired, one can produce, illustratively, the following combinations of product stream:

CHAIN LENGTH OF COMPONENTS

| First product stream | Second product stream |
|---|---|
| $C_{12-16}$ | $C_{10-14}$ |
| $C_{10-13}$ | $C_{10-14}$ |

VARIABLES AND DISCUSSION

From the foregoing examples it will be clear that the following variables have significant effect on the performance of any particular embodiment of the process;

Identity of product streams, i.e., range of chain lengths of components;

Recycle of lower-than-desired olefin portions in catalytic polymerization zone;

Identity of the lower-than-desired olefins transferred from the catalytic polymerization section to the stoichiometric chain growth section;

Degree of chain growth per pass in the chain growth reactor.

With respect to the identity of the two product streams, i.e., the range of molecular weights or chain length of the olefin components thereof, it is found as a general rule that the higher the molecular weight of the olefins, the lower the purity with respect to vinylidene olefin impurities. In general, in making products from either section up to the range of twenty to about twenty-four carbon atoms in the maximum molecular weight product component, no difficulty is encountered in providing a product having predominantly vinyl olefins. When vinyl olefins of 90 percent purity or greater are desired for such high molecular weight products, it is necessary to use in more intensity, some of the other factors expressed above and discussed below. When the product streams are in the range of 12 to 16 carbon atoms, the attainment of a good quality of at least 90 percent vinyl content is readily achieved.

The recycle of certain olefin components in the catalytic reaction zone is permissive in some instances, as in Example 1. However, if these recycled olefins are increased in quantity, or in molecular weight, they have an adverse effect on the product purity. Thus, when n-butene is recycled, the product purity will usually be approaching about 90 percent vinyl content in the $C_{12-16}$ range, but by eliminating an n-butene recycle, as in Example 2, the product purity is readily increased to at least about 95 percent. When the recycled olefin is a hexene containing stream, a lower product purity results.

The identity of the side streams transferred to the catalytic chain growth section is also an important variable. In general, the olefins immediately adjacent in chain length to the desired second product fraction are highly preferred for this transferred stream. Thus, when the second product stream is to include $C_{12-16}$ olefins the preferred olefin stream from the catalytic polymerization section is octenes and decenes, an even more highly preferred stream being a substantially pure decene stream. Similarly, if the desired product stream is to be a $C_{14}-C_{18}$ fraction, the most highly preferred transferred stream from the catalytic polymerization zone will be dodecene and an almost equally effective stream is a mixture of dodecene and decene.

The degree of chain growth carried out in each pass in the chain growth section is significant with respect to the distribution of individual components in the desired product fraction as already illustrated by Examples 3 and 4. In general, the most preferred range of chain growth is from about ½ to 2 moles of ethylene per aluminum alkyl group being fed to the chain growth reactor.

In all embodiments of the present invention, significant benefits are obtained with respect to both the catalytic polymerization section and with respect to the chain growth section operation. The reasons for these benefits, while not fully understood, is attributed to certain peculiarities of the several reactions involved.

As already indicated, it is preferred that lower-than-desired olefins recycled, if any, to the catalytic polymerization reaction should be "remote" from the desired range. At the same time, it has been discovered that the lower-than-desired olefins transferred to the chain growth section are preferably "close" to the desired product range. Accordingly, the preferred embodiments of the invention involve the withdrawal from the polymerization section of an olefin stream including those components lower than but immediately adjacent to the olefins of the desired product fraction.

It is believed that the benefit, on the catalytic polymerization operation of the non-recycle of the olefins close or immediately adjacent to the desired products, is a result of several factors. A vinyl olefin in contact with a trialkyl aluminum catalyst, under catalytic polymerization conditions, can react in several different ways. Firstly, it is susceptible to addition to aluminum hydride bonds, which means that it then re-establishes an alkyl group corresponding to the olefin. On the other hand, it is susceptible, as an intermediate reaction, to the addition to alkyl aluminum bonds already existent in which instance, a beta branched alkyl group is established, and as such alkyl groups are particularly susceptible to removal and appearance as alpha olefins, it is seen that the vinylidene end products would thereby result.

It would be expected that the lower-than-desired olefin components are, individually, on a stand-off basis with respect to the possibility of originating undesired vinylidene olefins. Thus, when a desired product is the twelve to sixteen carbon atom fraction, a recycled butene stream could react with an eight, ten, or twelve carbon alkyl group to form a beta branched alkyl group, which is responsible for vinylidene olefin impurity in the product range. Similarly, a recycled ten carbon atom normal olefin, such as n-decene-1, could also similarly react, in this case, with an ethyl, butyl, or hexyl radical, to engender a vinylidene radical which would then appear as a vinylidene alpha olefin impurity in the desired product range. Thus, in both cases, the recycled olefin would be expected to be a contributor to the impurity of the final product, with the same frequency or probability of formation of vinylidene impurities.

The most preferred forms of the invention, however, take further advantage of a characteristic of the catalytic process. This is that the number of moles, or the molal concentration, of olefins in the catalytic reaction zone and hence in the effluent, increases with decreasing chain length. A similar distribution is exhibited in the chain lengths of the alkyl groups of the trialkyl aluminum catalyst components. Thus, the concentration of n-butene and n-butyl radicals, in the reactor, is very much greater than the concentration of octene and hexene. As the existent presence of such lower molecular weight groups is necessary for the reaction with a recycled higher molecular weight olefin, then, any additional increment of the higher molecular weight olefins (again in the lower-than-desired product range) tends to increase the amount of vinylidene radicals in the product range. Hence, by the preferred operation of transferring the olefins in the chain length range immediately adjacent the desired product range, the purity of the vinyl olefins engendered and delivered by the catalytic polymerization section is significantly benefitted.

For example, if n-butene is recycled to a catalytic polymerization section, the vinyl olefin purity of a $C_{12-16}$ olefin product will be about 90 percent. On the other hand, if the olefins recycled include not only butenes, but also hexenes, the $C_{12-16}$ olefin product will be only about 80 percent, at the same operating conditions. When no olefins are recycled to the catalytic polymerization, a vinyl purity of 95 percent or better is readily achieved.

Using an olefin cut adjacent to the desired product range as a feed has also significant benefits in stoichiometric chain growth operations. By initiating a chain growth reaction with an aluminum trialkyl having no alkyl groups in the lower end of the spectrum, the specificity of the final aluminum alkyl generated is greatly increased, and hence, olefins derived from such trialkyl aluminum are similarly channelized to the desired product range fraction.

Illustratively, when aluminum alkyls are realized by chain growth starting with a mixture of aluminum hexyl, octyl, and decyl radicals, the ratio of the alkyl groups in the trialkyl generated, of the twelve to sixteen carbon atom length, to all others, is in the proportion of about 132 moles to 100 moles of all others, when the chain growth is continued to "peak" at the alkyl length of about 12 carbon atoms. On the other hand, if a chain growth were carried out on triethyl aluminum, illustratively, and sufficient ethylene is reacted therewith to obtain a "peak" at the same point, the distribution of the desired alkyl groups to all others is in the range of about 80–82 moles per 100 moles of non-desired groups. Thus, by providing as a feed to the chain growth operation or with alkyl groups predominating in the six-eight carbon atom length, the product distribution is improved by a factor of at least about 60 percent.

Even greater specificity is achieved as the olefins fed to the stoichiometric section approach in chain length the lower limit of the desired product range. As shown by the following table, when the desired product fraction is twelve to sixteen carbon olefins, and the beginning alkyl group in the chain growth operation is as shown, further benefits are achieved.

| Length of alkyl groups: | Moles of 12–16 carbon alkyl groups per 100 moles of all other alkyl groups |
| --- | --- |
| Hexyl only | 116–120 |
| Octyl only | 150–160 |
| Decyl only | 250–280 |
| Hexyl-octyl-decyl | 125–160 |
| Octyl-decyl | 180–220 |

The foregoing data correspond to a chain growth which is continued until the alkyl groups "peak" at about 12 carbon atoms. By this is meant, of course, that maximum molal concentration of resulting alkyl groups is at the value stated.

A further significant benefit in the transfer of olefins to the stoichiometric reaction section arises from the benefits in recovery operations. Thus, in the case of a $C_{12-16}$ olefin product as the second product, by using no olefins lower than hexenes, it is seen that the lowest molecular species of trialkyl aluminum which can be present in the stoichiometric section is trihexyl aluminum. Trihexyl aluminum is readily separable from the dodecenes by fractionation. On the other hand, if tri-n-butyl aluminum were present, this component would be vaporized or fractionated with the desired product olefins, and could then be eliminated from the system only by chemical treatment, i.e., oxidation and hydrolysis.

The precise conditions employed in the various reaction zones are not highly critical, and to a certain extent are already known in the art. The catalytic reaction or polymerization zone does require interrelated pressure and temperture conditions, and only the partial reaction of the ethylene feed thereto, in order to insure that the olefins generated will at least predominate in the vinyl species. One clear guide to achieving such a condition is disclosed in application Ser. No. 59,190, now abandoned, by T. H. Pearson and J. K. Presswood, wherein it is taught that the pressure should be above the pressure expressed by the relation $P = 33.5T - 5400$ or 700 pounds per square inch, whichever is higher and below the pressure expressed by the relation $P = 60T - 7700$ or 4,000 pounds per square inch, whichever is lower, wherein $P$ above is pressure in pounds per square inch and $T$ is temperature in ° C.

From the foregoing, it is seen that a pressure above 700 pounds and below 4,000 pounds per square inch is always desirably involved in the catalytic operation. However, in order to achieve a particularly high degree of vinyl olefin constituents in the alpha olefins generated, a preferred set of conditions are from 2,000 to 4,000 pounds per square inch, and a temperature between about 170 to 225° C. An even more preferred range of conditions is from about 180 to 200° C. operating temperature and between about 2500 to 3500 pounds per square inch total pressure. Further, as illustrated by the example, it is highly desirable to provide ethylene in excess to the reaction zone, so that the reactor effluent always includes an appreciable quantity of unreacted ethylene.

It will be understood by those skilled in the art that the original identity of the trialkyl aluminum employed as a catalyst is not critical. A particularly economical trialkyl aluminum catalyst is triethyl aluminum, but for catalytic purposes dialkyl aluminum hydride, or other trialkyl compounds, are all substantially equally effective. Indeed, as the catalyst component composition changes during its passage through the reaction zone, it is concluded that the effective catalyst moiety is the aluminum-carbon bond of an aluminum alkyl grouping, or an aluminum-hydrogen bond in an aluminum hydride. These latter bonds are almost invariably converted, under the rigorous conditions of catalytic polymerization, into aluminum alkyl groups as an incidental side reaction of the polymerization process. The other metallo-organic compounds taught by Ziegler and Gellert as polymerization catalysts can be substituted for the aluminum type catalysts, although such alternatives are appreciably more expensive.

The displacement operation of the chain growth section of the process is similarly known in the art. A typical mode of conducting the displacement type of reaction is described in Belgian Patent 594,803, and involves operation at a relatively elevated temperature, and employing an extended length tubular reaction zone.

The chain growth process, wherein trialkyl aluminum compounds are generated from the intermediate trialkyl aluminum component derived in the displacement reaction is, generally, known in the art. For example, see the mode of carrying out a chain growth type of reaction described in Belgian Patent 597,314, and in Belgian Patent 553,721, and in U.S. Patent 2,977,381.

In the reaction zones, viz., the catalytic polymerization, the displacement reaction, and the chain growth reaction zones, adequate provision must be made to assure the safe operability, according to the usual best recognized practices. The stoichiometric chain growth reaction is perhaps particularly sensitive, and careful provision should be made for cooling and for pressure relief, to avoid the consequences of possible runaway reactions. This is similarly required for the catalytic reactor and the chain growth reactor, particularly when the reaction temperatures are appreciably above 200° C.

What is claimed is:

1. An integrated process for the manufacture of predominantly vinyl alpha olefins of a selected high molecular weight range comprising, in combination, a catalytic ethylene polymerization section and a chain growth section, both as defined herein:
    (1) the ethylene polymerization section including the steps of polymerizing ethylene at elevated temperature and pressure under the influence of a trialkyl aluminum catalyst in catalytic proportions forming thereby a polymerization effluent comprising trialkyl aluminum catalyst and an olefin mixture ranging from olefins of lower to olefins of higher molecular weights than the product fraction desired, then separating from said polymerization effluent stream the olefin fraction having said selected molecular weight range, and a second olefin fraction containing at least the two olefins having molecular weights adjacent to but lower than those of said selected molecular weight range for use in the chain growth section as hereinafter described; and
    (2) the chain growth section including a displacement reaction between a higher alkyl trialkyl aluminum mixture and the second fraction from (1) whereby a lower alkyl trialkyl aluminum is produced having alkyl groups corresponding to the olefins of said second fraction and a further olefin fraction is released including olefins in said selected molecular weight range, then separating said further olefin fraction, and recirculating the said lower alkyl trialkyl aluminum and reacting with ethylene to produce by stoichiometric chain growth the higher alkyl trialkyl aluminum having a substantial proportion of alkyl groups in said selected molecular weight range and feeding said higher alkyl trialkyl aluminum at least in part to the displacement reaction.

2. A process for making a high vinyl content alpha olefin product predominating components ranging from 12 to 16 carbon atoms, inclusive, comprising in combination, a catalytic ethylene polymerization section and a chain growth section, both as defined herein:

(1) the ethylene polymerization section including the steps of polymerizing ethylene in the presence of a catalytic amount of a trialkyl aluminum catalyst derived from the chain growth section (2) as hereinafter described, said polymerization being at a temperature of from about 175 to 200° C., and at a pressure of from about 2500 to 3500 pounds per square inch, and forming thereby a polymerization effluent comprising trialkyl aluminum and an olefin mixture ranging from olefins of lower to olefins of higher molecular weights than the desired 12 through 16 carbon atom fraction, and separating from said polymerization effluent an olefin fraction having the 12 through 16 carbon atom olefins and a second olefin fraction consisting essentially of the olefins having from 6 to and not more than 10 carbon atoms, inclusive, for use in the chain growth section as hereinafter defined; and (2) the chain growth section including a displacement reaction between a higher trialkyl aluminum mixture obtained by chain growth as defined herein, and the second olefin fraction from (1) whereby a lower trialkyl aluminum mixture is produced having alkyl groups corresponding to the olefins of the second olefin fraction from (1), and a further olefin fraction including the desired 12 to 16 carbon atom product olefins, then separating the lower trialkyl aluminum mixture so produced and the said further olefin fraction, feeding the major part of the lower trialkyl aluminum to a chain growth reaction where it is reacted with ethylene to produce the higher alkyl trialkyl aluminum for feed to the displacement reaction, and feeding a minor part of the lower trialkyl aluminum as catalyst to the ethylene polymerizing reaction of the polymerization section (1).

3. A process for making a high vinyl content alpha olefin product of a selected high molecular weight range comprising, in combination, a catalytic ethylene polymerization section and a chain growth section, both as defined below:

(1) the ethylene polymerization section including the steps of polymerizing ethylene at elevated temperature and pressure under the influence of a trialkyl aluminum catalyst in catalytic proportions forming thereby a polymerization effluent comprising trialkyl aluminum catalyst and an olefin mixture ranging from butene to olefins of higher molecular weights than the product fraction desired, then separating from said polymerization effluent stream (a) the olefin fraction consisting essentially of olefins in the selected molecular weight range, (b) the butene fraction, and (c) the olefin fraction consisting essentially of the mixture of olefins having molecular weights immediately adjacent to but lower than those in the selected range, for use in the chain growth section as hereinafter described, and (2) the chain growth section including a displacement reaction between a higher alkyl trialkyl aluminum mixture and the (c) fraction from (1) whereby a lower alkyl trialkyl aluminum is produced having alkyl groups corresponding to the olefins of said (c) fraction and a further olefin fraction is released including those in the selected molecular weight range, then separating said further olefin fraction, and recirculating the said lower alkyl trialkyl aluminum and reacting it with ethylene to produce by curtailed stoichiometric chain growth the higher alkyl-trialkyl aluminum having substantially no alkyl groups longer than the chain length for the selected molecular weight range and feeding said higher alkyl trialkyl aluminum at least in part to the displacement reaction.

References Cited
UNITED STATES PATENTS

| | | | |
|---|---|---|---|
| 2,889,385 | 6/1959 | Catterall et al. | 260—683.15 |
| 2,906,794 | 9/1959 | Aldridge et al. | 260—683.15 |
| 3,017,438 | 1/1962 | Atwood | 260—488 X |
| 2,699,457 | 1/1955 | Ziegler et al. | 260—683.15 |

FOREIGN PATENTS 605,512  9/1960  Canada.

DELBERT E. GANTZ, *Primary Examiner.*

ALPHONSO SULLIVAN, *Examiner.*

C. E. SPRESSER, *Assistant Examiner.*